United States Patent [19]

Cahoon, Jr.

[11] 3,849,329

[45] Nov. 19, 1974

[54] METHOD FOR PRODUCING FUELED MODERATOR

[75] Inventor: John B. Cahoon, Jr., Livermore, Calif.

[73] Assignee: The United States of America as represented by the United States Atomic Energy Commission, Washington, D.C.

[22] Filed: Oct. 1, 1959

[21] Appl. No.: 843,900

[52] U.S. Cl................. 252/301.1 R, 106/55, 264/.5
[51] Int. Cl.......................... G21c 3/02, G21c 21/00
[58] Field of Search .......... 204/193, 234, 154, 234; 264/.5; 252/301.1 R; 106/55

[56] References Cited
UNITED STATES PATENTS

| | | | |
|---|---|---|---|
| 2,814,849 | 12/1957 | Hamilton | 106/55 X |
| 2,816,042 | 12/1957 | Hamilton | 106/55 |
| 2,818,605 | 11/1958 | Miller | 106/55 |

FOREIGN PATENTS OR APPLICATIONS

| | | |
|---|---|---|
| 788,284 | 12/1957 | Great Britain |

Primary Examiner—Benjamin R. Padgett
Assistant Examiner—R. E. Schafer
Attorney, Agent, or Firm—John A. Horan; Frederick A. Robertson

EXEMPLARY CLAIM

1. In a method for producing a high density fueled beryllia compact thermally stable at temperatures above 1,500° C, comprising the steps of dissolving about 4 percent by weight uranium chloride in ethyl alcohol, slurring an intermediate grade purity beryllia having a mean particle size of less than 10 microns in said ethyl alcohol solution, evaporating said solution at room temperature by the application of a vacuum pressure thereto, whereby free flowing powders are produced, compacting a quantity of said powders isostatically at a pressure greater than 20,000 psi, heating said compact in a furnace through which air is freely circulating for a period of at least 10 hours and to a maximum temperature of at least 1,000° F, and thereafter sintering said compact for at least 1 hour in hydrogen at a temperature at least as high as 1,500° C.

1 Claim, No Drawings

METHOD FOR PRODUCING FUELED MODERATOR

This invention relates to a method of incorporating a fissile fuel material into a beryllia moderator for use in a neutronic reactor. More specifically, it relates to a method for producing a urania-beryllia fuel-moderator composition which is thermally stable at temperatures above 1,500° C.

The invention provides a method of producing urania-fueled beryllia which is thermally stable at higher temperatures. This end product is produced by initially coating finely divided beryllia, or beryllium hydroxide, with an oxidizable uranium compound to produce a molding or compacting powder. These powders may thereafter be compacted and oxidized in air to form urania-fueled beryllia. Preferably the compact is thereafter sintered in a hydrogen atmosphere.

Beryllia, otherwise known as beryllium oxide, has in the prior art been employed as a moderator and reflector for thermal neutrons in nuclear reactors. As well known, beryllia has the requisite nuclear properties, and is in addition a ceramic material resistant to oxidation at high temperatures. Unlike graphite, which may also be used as a moderator at high temperatures, no cladding or protective means are required for beryllia in oxidizing atmospheres. This is especially important for high temperature, gas cooled stationary and airborne reactors undergoing development in the United States.

Since urania is a chemical having physical and ceramic properties compatible with beryllia at elevated temperatures, an obvious objective of the beryllia moderator reactor art has been to provide high density beryllia compacts into which urania fissile fuel is incorporated. Such fueled moderator components, e.g., compacts, enable simplier reactor construction in many instances. Specifically, in the instance of high temperature, mobile, gas cooled reactors, the use of single-piece fueled beryllia moderators of the preferred geometrical design, i.e., a cylindrical shape having a plurality of longitudinal bores, eliminates the need for a complicated support and fuel element structure.

In the prior art such thermally stable urania fueled beryllia has not been satisfactorily produced. In the most obvious method of production, that of mechanically mixing, forming and sintering a mixture of these two oxides, the resulting compact displays irregular grain growth, poor structural properties and complete loss of the urania through migration and vaporization at temperatures much above 1,000° C. In the experimental testing of more sophisticated methods and variations, such as co-precipitation, and extrusion methods, somewhat better results are obtainable, but problems still remain apparent. Specifically, high, near-theoretical, densities are generally obtained only at the expense of poor mechanical properties. Grain size, or growth during the sintering process has not been controllable, generally leading to cracks and distortions along grain boundaries. compressive and tensile strength are also generally lower with irregular grain growth so that mechanically the compacts must be supported, particularly at high temperatures. Sintered binary specimens of the prior art are also stated to have shown decrepitation or volume increases when subjected to an environment of air in the temperature range of 400° to 800° C. At temperatures above 1,500° C the urania is also stated to expand faster than the beryllia. The apparent high vapor pressure of the uranium oxide is repressed by the addition of yttrium oxide, $Y_2O_3$, to uranium loaded beryllia compacted by dry mixing, molding and sintering. Density and mechanical properties in these compacts, however, are not better than in compacts not containing yttrium oxide. Furthermore, yttrium is expensive and not generally available in quantities sufficient for inclusion in large reactors.

A method has now been discovered for producing uranium oxide loaded beryllia of theoretical, or almost theoretical, density and of a fine grain crystalline structure with excellent mechanical properties, which may be thermally cycled repeatedly at temperatures above 2,000° F without loss of uranium or adverse change in mechanical properties. The preferred embodiment of the method comprises slurrying finely divided beryllia, or beryllium hydroxide, with uranyl halide dissolved in a solvent together optionally with a lubricant such as camphor. The solvent, normally ethyl alcohol, is slowly evaporated to yield compacting powders consisting of beryllia coated with the uranium compound and with the lubricant, when employed. Subsequently at any time thereafter these powders are compacted, as by cold molding in a die press, and oxidized in air at an elevated temperature, whereby the uranium is converted to the oxide. The compact is thereafter preferably sintered in a hydrogen atmosphere to develop further the desired crystalline and mechanical properties.

The resulting compact has a high structural strength, a density comparable with that produced by former cold pressing methods (in which only poor mechanical properties were obtained) and retains the urania at temperatures above 1,500° C almost without loss through vaporization under static conditions.

Accordingly, an object of the invention is to provide a method for producing uranium fueled beryllia. More specifically, an object of the invention is to provide urania-fueled beryllia which has a high, near theoretical density, an even fine grain structure, and high mechanical strength, and which can be thermally cycled at temperatures above 1,000° C without migration or loss of uranium.

Another object of the invention is to provide a method for producing urania fueled beryllia compacts in such forms and shapes as may be used, or combined to be used, as a single piece fueled moderator material for a neutronic reactor. Further, another object is to produce such core material for use in a high temperature, gas cooled, mobile reactor; more specifically an object is to provide a method for producing a fueled moderator for a high temperature airborne reactor employing liquid hydrogen as a coolant and having an operating period of 60 seconds or more.

Another object of the invention is to provide a method for producing urania fueled beryllia by initially producing powders consisting of beryllia particles coated with an oxidizable uranium compound, and thereafter compressing said powders and oxidizing said uranium compound to the oxide. Specifically an object of the invention is to provide a method for coating finely divided beryllia with a uranyl halide by slurring said beryllia particles in a solution of said halide and evaporating said solvent, and thereafter compressing said powders, oxidizing said compact in air under heat, and finally sintering same in a hydrogen atmosphere. Another object of the invention is to use $Be(OH)_2$ instead of BeO as the initial beryllium containing material and to convert same to beryllia in a high temperature oxidizing step.

In accordance with the method of the invention there is first provided a quantity of finely divided beryllia powders. If desired, Be(OH)$_2$ of comparable quality and size may be used as a substitute for the beryllia. The particle size and purity is not critical for practice of the method, but under the precise teachings and variations described herein somewhat superior results have been attained with beryllia particles of less than 10 microns mean particle size diameter and of intermediate purity, namely, having about 1 percent impurities consisting mainly of aluminum, calcium, magnesium, chromium, silicon, and sodium compounds. A uranium halide compound which may be oxidized to form a uranium oxide compound is also provided; generally this will be a reactor grade material.

In the practice of the invention, the uranyl halide, e.g., uranium chloride, is first dissolved in a solvent, preferably ethyl alcohol, in quantities calculated to yield a moderator composition having the proper ratio of beryllium to fissile uranium atoms. Based upon the weight percentage of the beryllia, this amount will vary within the range of about 1-10 percent UCl$_4$; however, the invention is not restricted to what have been considered preferred amounts in the prior art. An amount of organic lubricant is also sometimes added, e.g., camphor in amounts of about 4 weight percent of the beryllia, to serve as an adhesive or lubricant in the subsequent molding step, although not necessary in the preferred embodiments. The beryllia particles are then slurried into the solution and the solvent is then slowly evaporated by the application of vacuum. Heat may be used if the solution temperature does not greatly exceed room temperature. Care should be exercised not to raise the dry particle temperature above the decomposition or oxidation point. There results a free flowing powder which may be stored indefinitely and used under the method of the invention to produce a compact whenever desired.

When it is desired to produce a compact, the free flowing powders are formed preferably by a cold molding process, i.e., in a conventional double ram press or isostatically. A pressure in excess of 20,000 psi is generally sufficient to form a compact of maximum or near theoretical density. After the compact is formed and removed, if desired, the temperature of the pressing is slowly raised to a temperature in excess of 1,000° F over a period of about 5 or more hours in an atmosphere of air or oxygen to burn out the camphor, if employed, and oxidize the uranium to the oxide. In the instance Be(OH)$_2$ is used instead of BeO, the former is also converted to the latter at this point by the application of heat. Calcining or sintering to develop the desired crystalline properties is preferably carried out in a hydrogen atmosphere. Sintering temperatures in excess of 1,600° C have been found satisfactory, although the temperature does not appear to be particularly critical.

Specimens produced by the foregoing method have been thermally cycled between 1,000° and 2,300° F without loss of weight or adverse change in structural properties or strength.

Further details of the invention will become apparent upon consideration of the following example.

EXAMPLE

Approximately 11.8 grams of BeO were slurried in a quantity of ethyl alcohol in which about 0.5 g each of camphor and UCl$_4$ had been dissolved. the BeO particles had a mean particle size of less than 10 microns and contained about one percent impurities listed by the manufacturer as follows: 500 ppm Al, 320 ppm Ca, 4,750 ppm Mg, 548 ppm Cr, 580 ppm Si, 3,800 ppm Na, 100 ppm Fe, 1.30 ppm B, 210 ppm Mn, 26 ppm Ni, and 0.35 ppm loss on ignition. The alcohol was completely evaporated by maintaining a slurry under a vacuum of a few microns. The particles were mechanically agitated during the process, resulting in a thin, uniform coating of camphor and uranium tetrachloride. The dry particles were placed in an isostatic water-operated die and cold molded at 30,000. The molded compact was placed in an electric furnace through which air freely circulated and the temperature was slowly raised, in 250° F increments, over a period of 15 hours, to 1,000° F to burn out the camphor and completely oxidize and convert the uranium chloride to uranium oxide, U$_3$O$_8$. The compact was finally fired in a tungsten resistance furnace in a hydrogen atmosphere for one hour at a maximum temperature of 1,560° C. Final weight was 11.7 grams. The density measurements indicated a slightly higher density than theoretical, the theoretical density being 3.085 g/cc and the actual density being 3.095 g/cc. The density of a sample of pure beryllia and camphor run as a control without any uranium containing material being added was 3.03 theoretical and 2.86 actual. A sample in which Be(OH)$_2$ was used instead of BeO as the initial constituent, the hydroxide decomposing to form the oxide in the oxidation step, had a theoretical density of 3.085 and an actual density of 3.10. The fueled compact of the invention was heated in air to 2,750° F without loss of weight or mechanical strength. It was further thermally cycled six times between 1,600° and 2,290° F, two cycles being run during each of succeeding days to the higher temperature which was maintained each time for one hour. The specimen was maintained at the lower temperature overnight. There was no weight change or loss of mechanical strength and the density at the conclusion of the six cycles was 99.38 percent theoretical. X-ray diffraction showed the sample to consist of U$_3$O$_8$, BeO and two unknown phases, thought to be uranium compounds and alloys. The mechanical properties of the fueled beryllia compact were observed to be comparable with the unfueled beryllia compacts of the prior art.

The experiment was repeated a number of times using comparable amounts of materials and virtually identical techniques and conditions, except that the camphor was omitted completely. In every instance the properties of the resulting compact, including density, mechanical properties and retention of uranium at high temperature, were observed from measurements to be of the same quality as the compacts in which camphor was used.

While the invention has been described with respect to several preferred embodiments, it will be apparent to those skilled in the art that numerous variations and modifications may be made within the spirit and scope of the invention and thus it is not intended to limit the invention except as defined in the following claims

What is claimed is:

1. In a method for producing a high density fueled beryllia compact thermally stable at temperatures above 1,500° C, comprising the steps of dissolving about 4 percent by weight uranium chloride in ethyl alcohol, slurring an intermediate grade purity beryllia having a mean particle size of less than 10 microns in said ethyl alcohol solution, evaporating said solution at room temperature by the application of a vacuum pressure thereto, whereby free flowing powders are produced, compacting a quantity of said powders isostatically at a pressure greater than 20,000 psi, heating said compact in a furnace through which air is freely circulating for a period of at least 10 hours and to a maximum temperature of at least 1,000° F, and thereafter sintering said compact for at least 1 hour in hydrogen at a temperature at least as high as 1,500° C.

* * * * *